(12) United States Patent
Petniunas et al.

(10) Patent No.: US 10,848,744 B2
(45) Date of Patent: Nov. 24, 2020

(54) VEHICLE CAMERA ALIGNMENT

(71) Applicant: Ford Global Technologies, LLC, Dearborn, MI (US)

(72) Inventors: Alexander Petniunas, Canton, MI (US); Patrick Brautigan, Detroit, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/287,138

(22) Filed: Feb. 27, 2019

(65) Prior Publication Data

US 2020/0275033 A1 Aug. 27, 2020

(51) Int. Cl.
*H04N 13/246* (2018.01)
*G06T 7/521* (2017.01)
*G06T 7/80* (2017.01)
*G02B 6/42* (2006.01)
*H04N 5/232* (2006.01)
*H04N 13/139* (2018.01)
*H04N 13/204* (2018.01)

(52) U.S. Cl.
CPC ......... *H04N 13/246* (2018.05); *G02B 6/4226* (2013.01); *G02B 6/4227* (2013.01); *G06T 7/521* (2017.01); *G06T 7/80* (2017.01); *H04N 5/232127* (2018.08); *H04N 13/139* (2018.05); *H04N 13/204* (2018.05)

(58) Field of Classification Search
CPC .. H04N 5/23217; H04N 13/00; H04N 13/139; H04N 13/167; H04N 13/204; H04N 13/246; H04N 13/296; H04N 13/327; H04N 17/002; G06T 7/521; G06T 7/80; G02B 6/4226; G02B 6/4227

See application file for complete search history.

(56) References Cited

U.S. PATENT DOCUMENTS

| | | | |
|---|---|---|---|
| 4,818,858 A * | 4/1989 | Sorimachi | G02B 30/00 250/203.2 |
| 6,191,809 B1 * | 2/2001 | Hori | A61B 1/00193 348/45 |
| 7,069,667 B2 | 7/2006 | Bonham et al. | |
| 8,269,982 B1 * | 9/2012 | Olczak | G01B 11/162 356/513 |
| 8,427,636 B2 | 4/2013 | Prince et al. | |
| 8,717,450 B2 * | 5/2014 | Baker | G01C 11/02 348/208.14 |
| 9,161,020 B2 * | 10/2015 | Zhen | H04N 13/296 |
| 9,357,208 B2 | 5/2016 | Gupta et al. | |

(Continued)

FOREIGN PATENT DOCUMENTS

| | | |
|---|---|---|
| CN | 106815868 A | 6/2017 |
| DE | 102014219423 A1 | 3/2016 |

*Primary Examiner* — Lin Ye
*Assistant Examiner* — Chriss S Yoder, III
(74) *Attorney, Agent, or Firm* — Frank A. MacKenzie; Bejin Bieneman PLC

(57) ABSTRACT

A system includes two stereo cameras mounted on a vehicle, at least one sensor arranged to detect a relative alignment of the stereo cameras, and a computer communicatively coupled to the stereo cameras and the at least one sensor. The computer is programmed to continuously apply a compensating adjustment to one of the stereo cameras based on the relative alignment.

20 Claims, 12 Drawing Sheets

(56) References Cited

U.S. PATENT DOCUMENTS

2012/0206808 A1\* 8/2012 Brown .................. G02B 5/122
                                                    359/529
2018/0040141 A1   2/2018 Guerreiro et al.

\* cited by examiner

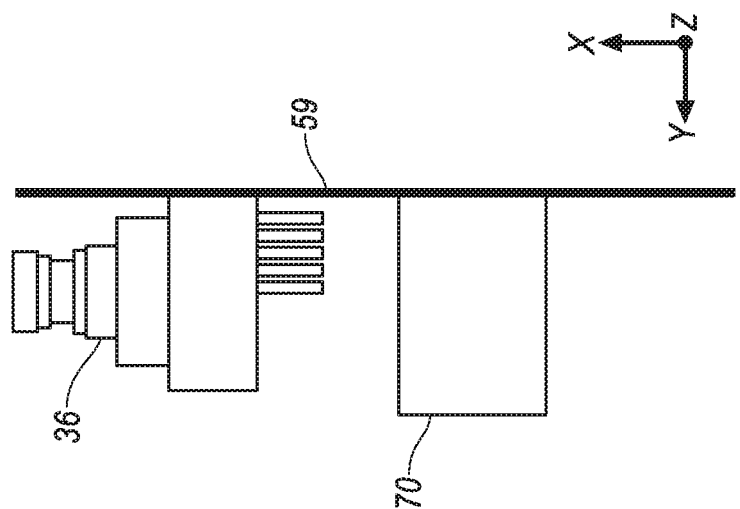
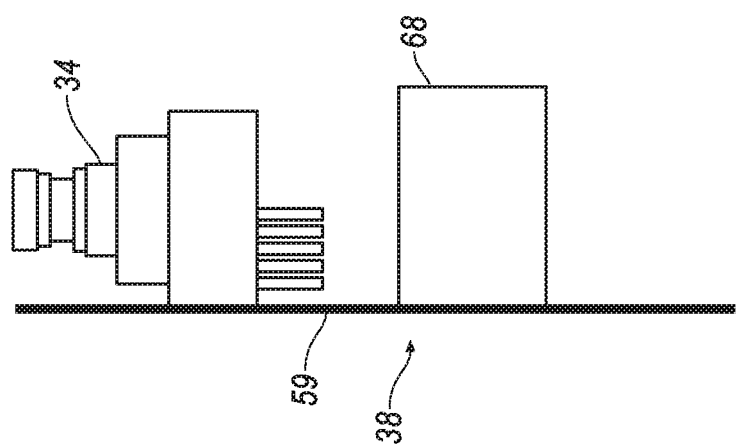
FIG. 9

VEHICLE CAMERA ALIGNMENT

BACKGROUND

Vehicles include various sensors. One type of sensor is a stereo camera. Differences between image data from two stereo cameras having an overlapping field of view can be used to generate three-dimensional data about data in the overlapping field of view of the stereo cameras. The three-dimensional data can be used by autonomous- or semi-autonomous-driving algorithms, for example.

The relative alignment of the stereo cameras can affect the precision or accuracy of the three-dimensional data; i.e., if one stereo camera moves relative to the other, the precision or accuracy of the three-dimensional data can decrease. For stereo cameras on vehicles, changes in relative alignment can be caused by aerodynamic flexure, body twist over uneven terrain, bending of a structure on which the stereo cameras are mounted, vibration through the structure, and thermal effects.

BRIEF DESCRIPTION OF THE DRAWINGS

FIG. 9 is a top diagrammatic view of a fifth example of the stereo cameras and sensors for detecting the relative alignment of the stereo cameras.

DETAILED DESCRIPTION

Figure 1:
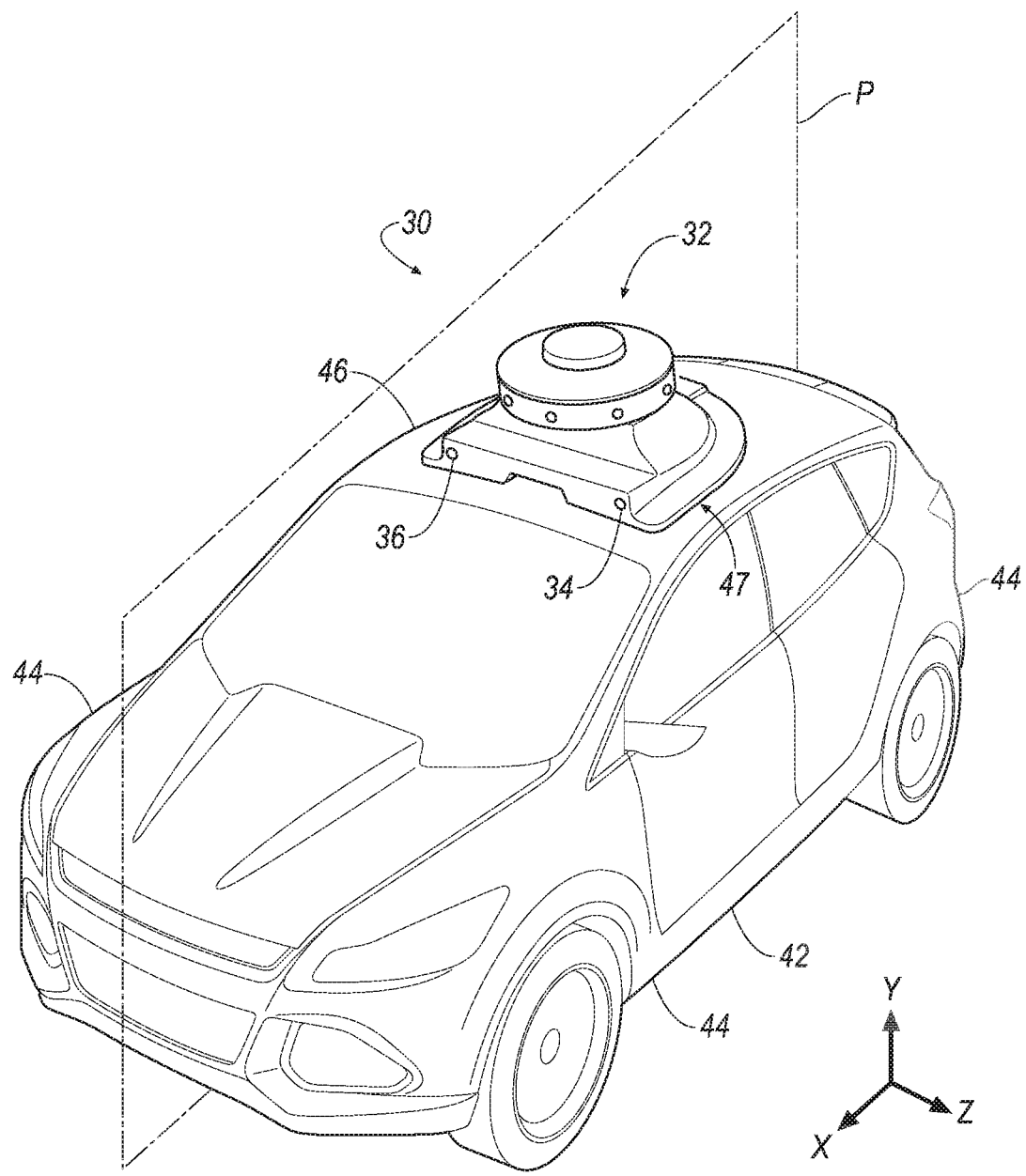
FIG. 1 is a perspective view of an example vehicle.

The system described herein provides a way to compensate for changes to the relative alignment of stereo cameras and helps address the technical challenges of installing stereo cameras for a vehicle. This compensation can directly increase the precision or accuracy of data provided by the stereo cameras. Furthermore, the system permits the stereo cameras to be located farther from each other than might otherwise be possible, which also increases the precision of the data provided by the stereo cameras. The system can further advantageously decrease vehicle weight by obviating a need for stiffening structures to reduce changes in relative alignment between the stereo cameras.

The system includes two stereo cameras mounted on a vehicle, at least one sensor arranged to detect a relative alignment of the stereo cameras, and a computer communicatively coupled to the stereo cameras and the at least one sensor. The computer is programmed to continuously apply a compensating adjustment to one of the stereo cameras based on the relative alignment.

The at least one sensor may include a laser and a receptor each fixed relative to a first of the stereo cameras and a reflector fixed relative to a second of the stereo cameras, and the computer may be further programmed to determine the relative alignment based on data from the receptor. The reflector may have at least three diffuse, nonplanar surfaces, and the data from the receptor may include speckle patterns for the three surfaces.

The at least one sensor may include three interferometers fixed relative to the first stereo camera.

The reflector may include a plurality of diffraction gratings each having a different orientation.

The at least one sensor may include at least three deflectometers fixed relative to the first stereo camera.

The at least one sensor may include two inertial measurement units each fixed relative to a respective one of the stereo cameras.

The system may further include at least one actuator positioned to move the one of the stereo cameras in at least two dimensions, and applying a compensating adjustment to one of the two stereo cameras may include instructing the at least one actuator to move the one of the stereo cameras.

A computer includes a processor and a memory storing instructions executable by the processor to continuously apply a compensating adjustment to one of two stereo cameras mounted on a vehicle based on a relative alignment of the stereo cameras.

The instructions may further include determining the relative alignment based on data from a receptor positioned to detect light generated by a laser fixed relative to one of the stereo cameras and reflected off a reflector fixed relative to the other of the stereo cameras. The reflector may have at least three diffuse, nonplanar surfaces, and the data from the receptor may include speckle patterns for the three surfaces.

The laser and the receptor may be included in one of at least three interferometers, and determining the relative alignment based on data from the receptor may include determining the relative alignment based on data from the interferometers.

The reflector may include a plurality of diffraction gratings each having a different orientation.

The laser and the receptor may be included in one of at least three deflectometers, and determining the relative alignment based on data from the receptor may include determining the relative alignment based on data from the deflectometers.

The instructions may further include determining the relative alignment based on data from two inertial measurement units each fixed relative to a respective one of the stereo cameras.

The instructions may further include determining the relative alignment based on data from a sensor detecting light transmitted through a plurality of optical fibers extending along a rod elongated between two ends fixed relative to a respective one of the stereo cameras.

Applying a compensating adjustment to one of the two stereo cameras may include instructing at least one actuator to move the one of the stereo cameras in at least two dimensions.

The compensating adjustment may be a pixel shift in two dimensions applied to visual data from the one of the stereo cameras.

Applying a compensating adjustment to one of the two stereo cameras may include discarding visual data produced when the relative alignment is outside the threshold.

A method includes continuously applying a compensating adjustment to one of two stereo cameras mounted on a vehicle based on a relative alignment of the stereo cameras.

With reference to the Figures, a system 32 includes two stereo cameras 34, 36 mounted on a vehicle 30; at least one sensor 38 arranged to detect a relative alignment of the stereo cameras 34, 36; and a computer 40 communicatively coupled to the stereo cameras 34, 36 and the at least one sensor 38. The computer 40 is programmed to substantially continuously apply a compensating adjustment to one of the stereo cameras 34, 36 based on the relative alignment.

With reference to FIG. 1, the vehicle 30 may be any passenger or commercial automobile such as a car, a truck, a sport utility vehicle, a crossover vehicle, a van, a minivan, a taxi, a bus, etc.

The vehicle 30 includes a body 42. The vehicle 30 may be of a unibody construction, in which a frame and the body 42 of the vehicle 30 are a single component. The vehicle 30 may, alternatively, be of a body-on-frame construction, in which the frame supports the body 42 that is a separate component from the frame. The frame and the body 42 may be formed of any suitable material, for example, steel, aluminum, etc. The body 42 includes body panels 44, 46 partially defining an exterior of the vehicle 30. The body panels 44, 46 may present a class-A surface, e.g., a finished surface exposed to view by a customer and free of unaesthetic blemishes and defects. The body panels 44, 46 include, e.g., a roof 46, etc.

The stereo cameras 34, 36 include a first stereo camera 34 and a second stereo camera 36. The stereo cameras 34, 36 detect electromagnetic radiation in some range of wavelengths. For example, the stereo cameras 34, 36 may detect visible light, infrared radiation, ultraviolet light, or some range of wavelengths including visible, infrared, and/or ultraviolet light. For another example, the stereo cameras 34, 36 may be time-of-flight (TOF) cameras, which include a modulated light source for illuminating the environment and detect both reflected light from the modulated light source and ambient light to sense reflectivity amplitudes and distances to the scene.

The stereo cameras 34, 36 are mounted on the vehicle 30, directly or indirectly. For example, the stereo cameras 34, 36 can be mounted on one of the body panels 44, 46, e.g., the roof 46. For another example, the stereo cameras 34, 36 can be mounted to a housing 47, e.g., mounted inside the housing 47, and the housing 47 can be mounted on one of the body panels 44, 46, e.g., the roof 46, as shown in FIG. 1.

The stereo cameras 34, 36 are oriented to provide three-dimensional data about a scene in a field of view of the stereo cameras 34, 36. The stereo cameras 34, 36 are oriented to point in approximately a same direction, e.g., forward relative to the vehicle 30, and to have fields of view that overlap. Differences between image data from the two stereo cameras 34, 36 in the overlapping field of view can be used to generate three-dimensional data about the scene, e.g., according to known algorithms. Positioning the stereo cameras 34, 36 farther apart can accentuate the differences between image data from the two stereo cameras 34, 36 and therefore provide more detailed or more reliable three-dimensional data. The stereo cameras 34, 36 can each be located closer to a respective side of the vehicle 30 than to a longitudinal center plane P of the vehicle 30, e.g., if mounted on the roof 46, the stereo cameras 34, 36 can each be located closer to a respective left or right edge of the roof 46 than to the longitudinal center plane P of the vehicle 30. The longitudinal center plane P is oriented vertically and along a vehicle-forward direction through a center of the vehicle 30.

Figure 2:
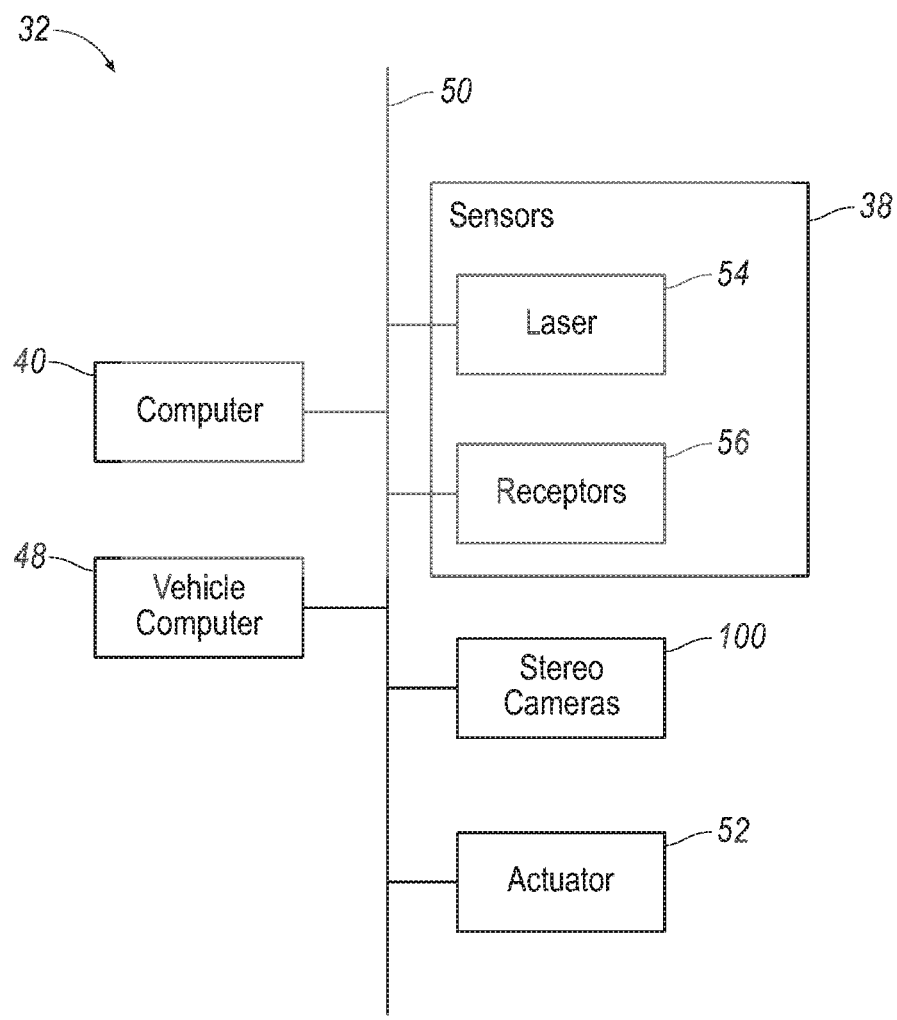
FIG. 2 is a block diagram of an example control system for stereo cameras of the vehicle.

With reference to FIG. 2, the vehicle 30 may be an autonomous vehicle. A vehicle computer 48 can be programmed to operate the vehicle 30 independently of the intervention of a human driver, completely or to a lesser degree. The vehicle computer 48 may be programmed to operate the propulsion, brake system, steering, and/or other vehicle systems based on data received from the stereo cameras 34, 36 and from other noncamera sensors. For the purposes of this disclosure, autonomous operation means the vehicle computer 48 controls the propulsion, brake system, and steering without input from a human driver; semi-autonomous operation means the vehicle computer 48 controls one or two of the propulsion, brake system, and steering and a human driver controls the remainder; and nonautonomous operation means a human driver controls the propulsion, brake system, and steering.

The vehicle computer 48 is a microprocessor-based computer. The vehicle computer 48 includes a processor, memory, etc. The memory of the vehicle computer 48 includes memory for storing instructions executable by the processor as well as for electronically storing data and/or databases.

The computer 40 is one or more microprocessor-based computers. The computer 40 includes memory, at least one processor, etc. The memory of the computer 40 includes memory for storing instructions executable by the processor as well as for electronically storing data and/or databases. The computer 40 may be the same computer as the vehicle computer 48, or the computer 40 may be one or more separate computers in communication with the vehicle computer 48 via a communications network 50, or the computer 40 may encompass multiple computers including the vehicle computer 48. As a separate computer, the computer 40 may be or include, e.g., one or more electronic control units or modules (ECUs or ECMs).

The computer 40 may transmit and receive data through the communications network 50, which may be a controller area network (CAN) bus, Ethernet, WiFi, Local Interconnect Network (LIN), onboard diagnostics connector (OBD-II), and/or by any other wired or wireless communications network. The computer 40 may be communicatively coupled to the vehicle computer 48, the sensors 38, the stereo cameras 34, 36, an actuator 52, and other components via the communications network 50.

With reference to FIGS. 3, 5-6, and 8-10, at least one sensor 38 is arranged to detect a relative alignment of the stereo cameras 34, 36. For the purposes of this disclosure, "relative alignment" of two objects means the position and/or orientation in space of one of the objects, with the other object as a frame of reference. The at least one sensor 38 is arranged to detect the relative alignment of the first stereo camera 34 and the second stereo camera 36; in other words, the at least one sensor 38 can detect the position and/or orientation of the second stereo camera 36 in a frame of reference defined by the first stereo camera 34 (or, equivalently, the position and/or orientation of the first stereo camera 34 in a frame of reference defined by the second stereo camera 36). The relative alignment can be represented in up to three spatial dimensions and/or up to three rotational dimensions. For example, the relative alignment can be represented in two rotational dimensions, around a horizontal, lateral axis Y and around a vertical axis Z, for which the axes Y and Z are defined by the first stereo camera 34 as a frame of reference. The dimensions constituting the relative alignment can be represented as deviations from a baseline position and orientation in the frame of reference.

With reference to examples of the at least one sensor 38 in FIGS. 3, 5-6, and 8, the at least one sensor 38 includes at least one laser 54, at least one receptor 56, and at least one reflector 58. The laser 54 and the receptor 56 are fixed relative to the first stereo camera 34, and the reflector 58 is fixed relative to the second stereo camera 36. For the purposes of this disclosure, A is "fixed relative to" B means A is attached to B and A's motion relative to B (or vice versa) is negligible, i.e., sufficiently small to be ignored in measurements. The laser 54 and the receptor 56 can be attached to the first stereo camera 34 via a short, stiff beam 59, and the reflector 58 can be attached to the second stereo camera 36 via another short, stiff beam 59. Because the flexing and twisting of the roof 46 is nonnegligible, the laser 54 and the receptor 56 are not fixed relative to the second stereo camera 36, and the reflector 58 is not fixed relative to the first stereo camera 34.

The receptor 56 is sensitive to and can detect light generated by the laser 54. The laser 54, reflector 58, and receptor 56 are positioned so that the receptor 56 receives light generated by the laser 54 and reflected off the reflector 58.

Figure 3:
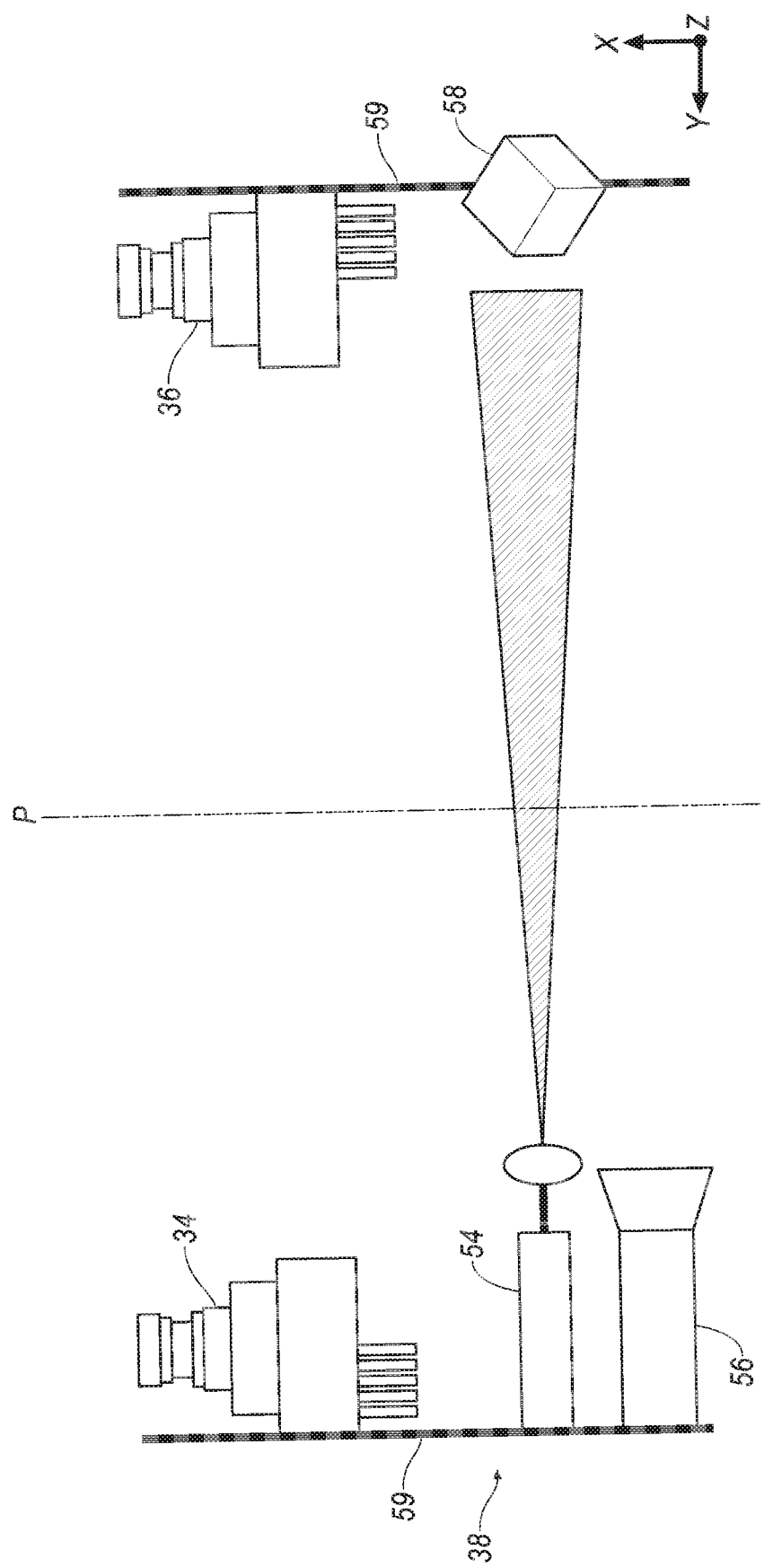
FIG. 3 is a top diagrammatic view of a first example of the stereo cameras and sensors for detecting a relative alignment of the stereo cameras.
Figure 4:
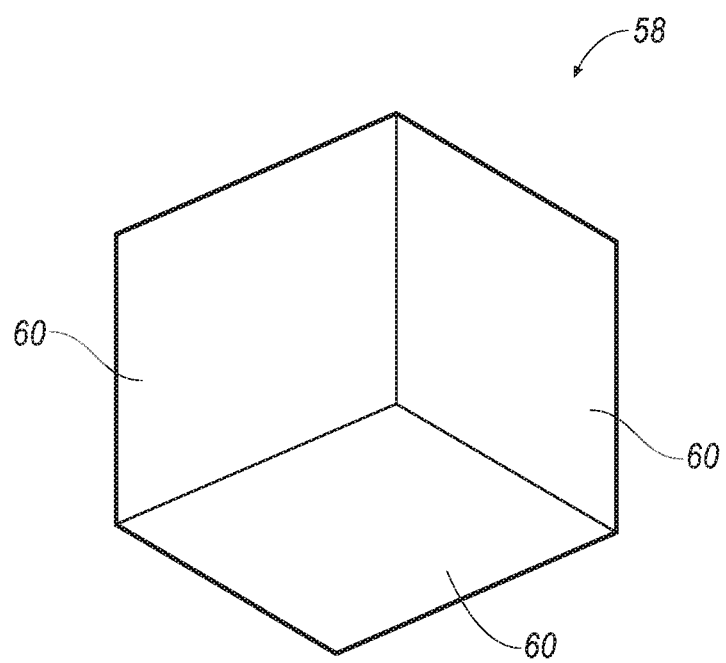
FIG. 4 is a plan view of a reflector from FIG. 3.

With reference to the example of FIGS. 3 and 4, the at least one sensor 38 includes one laser 54, one reflector 58, and one receptor 56. The laser 54 is aimed at the reflector 58, and the receptor 56 has a field of view centered on the reflector 58. The reflector 58 has three diffuse, nonplanar surfaces 60. For the purposes of this disclosure, "diffuse" for a surface means that light reflected off the surface is scattered in many directions, i.e., the opposite of specular. For the purposes of this disclosure, "nonplanar" means all surfaces define different planes than all other surfaces. For example, the reflector 58 can be a corner of a cube, i.e., three surfaces 60 meeting at right angles at a vertex. The corner of the cube can be either inside or outside the cube, i.e., pointed away from the laser 54 or pointed toward the laser 54.

Figure 5:
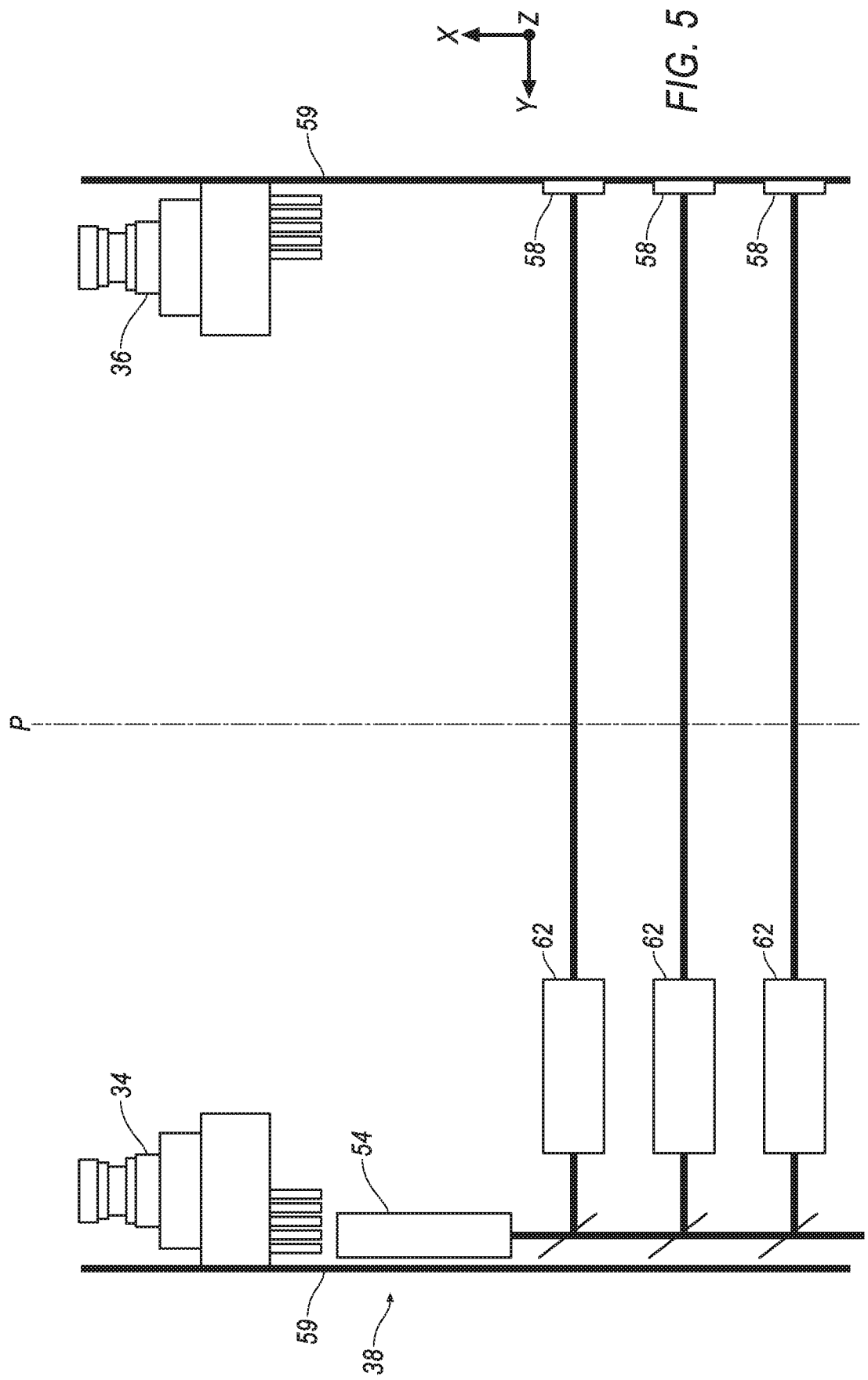
FIG. 5 is a top diagrammatic view of a second example of the stereo cameras and sensors for detecting the relative alignment of the stereo cameras.

With reference to the example of FIG. 5, the at least one sensor 38 includes three interferometers 62 fixed relative to the first stereo camera 34. Each interferometer 62 can receive a split from a beam generated by a single laser 54, or each interferometer 62 can include its own laser 54. Each interferometer 62 includes a receptor 56, and each interferometer 62 is aimed at a respective reflector 58 fixed relative to the second stereo camera 36. The reflectors 58 are diffuse. Each interferometer 62 is oriented to measure a tilt of the respective reflector 58 about a respective axis, and the three axes are mutually transverse, i.e., each axis is transverse to both other axes, e.g., mutually perpendicular, e.g., axes X, Y, Z. The interferometers 62 measure the tilt by generating a collimated beam of light toward the reflector 58 and receiving a fringe pattern, i.e., a pattern of bright and dark bands produced by light waves being in and out of phase, in the reflected light with the receptors 56. The interferometers 62 may be any suitable type of interferometer 62, e.g., Michelson, Mach-Zehnder, etc.

Figure 6:
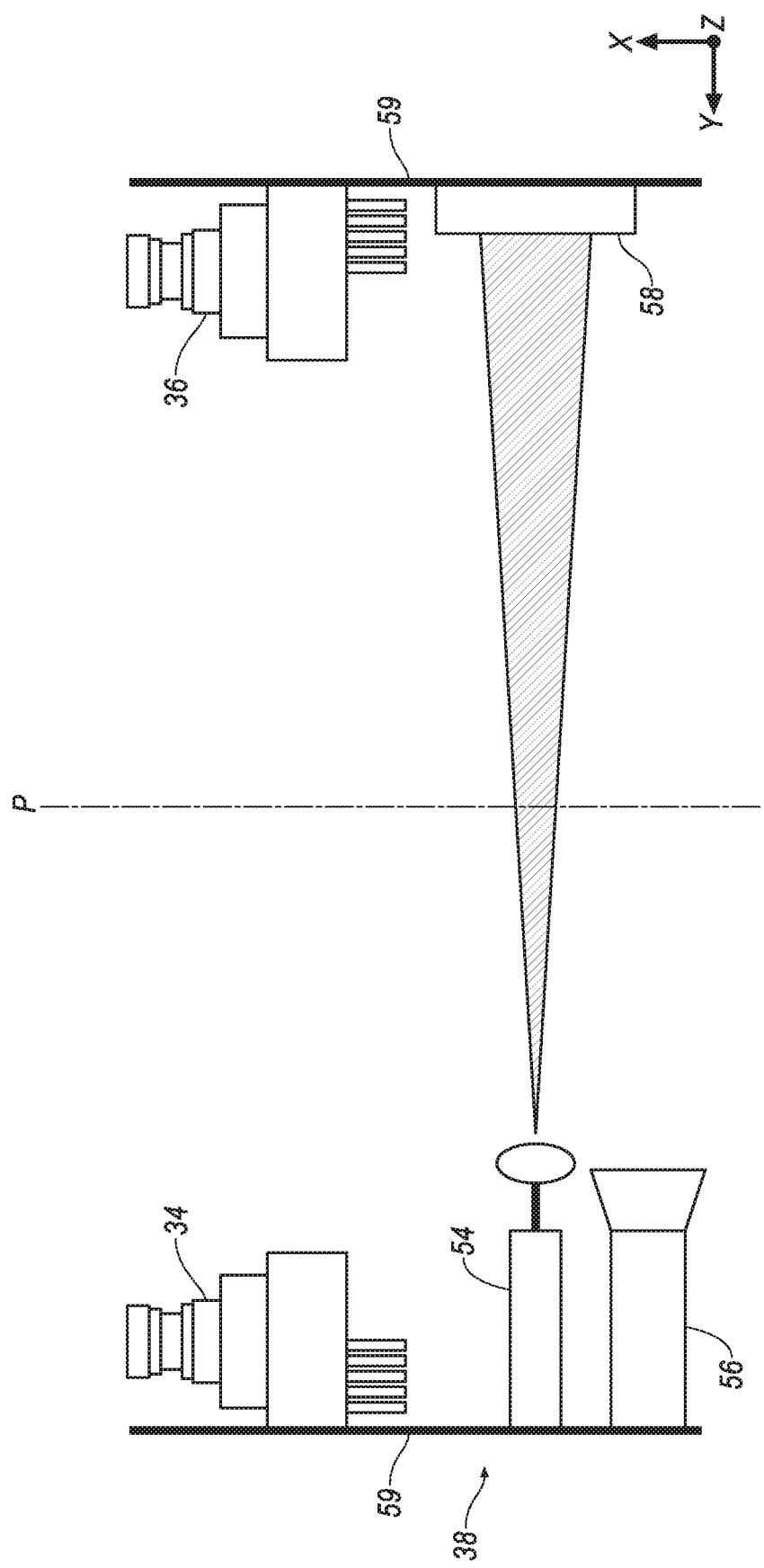
FIG. 6 is a top diagrammatic view of a third example of the stereo cameras and sensors for detecting the relative alignment of the stereo cameras.
Figure 7:
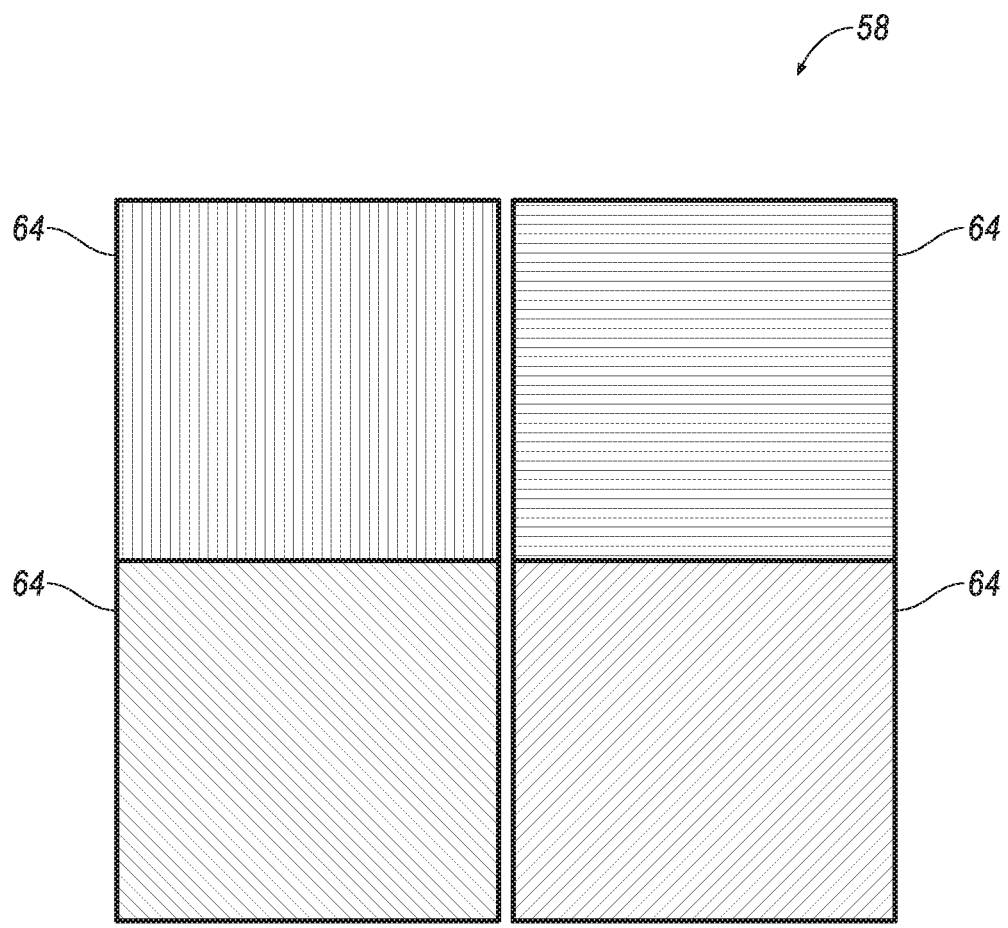
FIG. 7 is a plan view of a reflector from FIG. 6.

With reference to the example of FIGS. 6 and 7, the at least one sensor 38 includes one laser 54, one reflector 58, and one receptor 56. The laser 54 is aimed at the reflector 58, and the receptor 56 has a field of view centered on the reflector 58. The reflector 58 includes a plurality of diffraction gratings 64 each having a different orientation, e.g., a two-by-two matrix of diffraction gratings 64, as shown in FIG. 7, or a three-by-three matrix of diffraction gratings 64. Each orientation of one of the diffraction gratings 64 permits measurements of tilt about a different axis.

Figure 8:
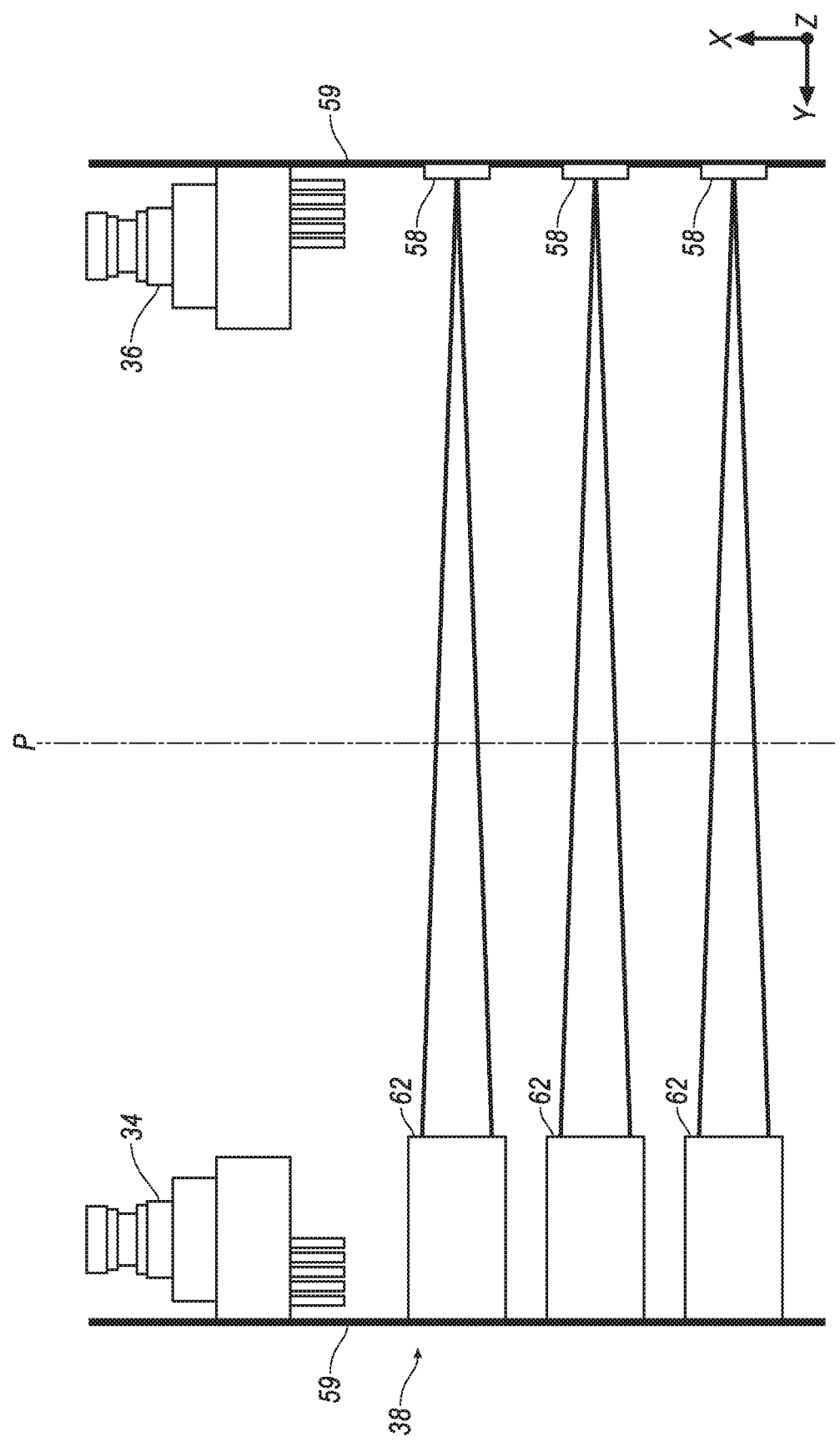
FIG. 8 is a top diagrammatic view of a fourth example of the stereo cameras and sensors for detecting the relative alignment of the stereo cameras.

With reference to the example of FIG. 8, the at least one sensor 38 includes at least three deflectometers 66 fixed relative to the first stereo camera 34. Each deflectometer 66 includes a laser 54 and a receptor 56. Each laser 54 is aimed at a respective reflector 58 fixed relative to the second stereo camera 36. Each receptor 56 is positioned to detect an apparent position of a point of light from the respective laser 54 on the respective reflector 58. A change in distance between each deflectometer 66 and the respective point of light on the respective reflector 58 corresponds to an angular change about an axis. Including three deflectometers 66 permits measurement about three axes of rotation.

With reference to the example of FIG. 9, the at least one sensor 38 includes two inertial measurement units 68, 70 each fixed relative to a respective one of the stereo cameras 34, 36; i.e., a first inertial measurement unit 68 is fixed relative to the first stereo camera 34, and a second inertial measurement unit 70 is fixed relative to the second stereo camera 36. The inertial measurement units 68, 70 detect specific force and angular rate. The inertial measurement units 68, 70 include at least one accelerometer, at least one gyroscope, and possibly a magnetometer (not shown), as is known.

Figure 10:
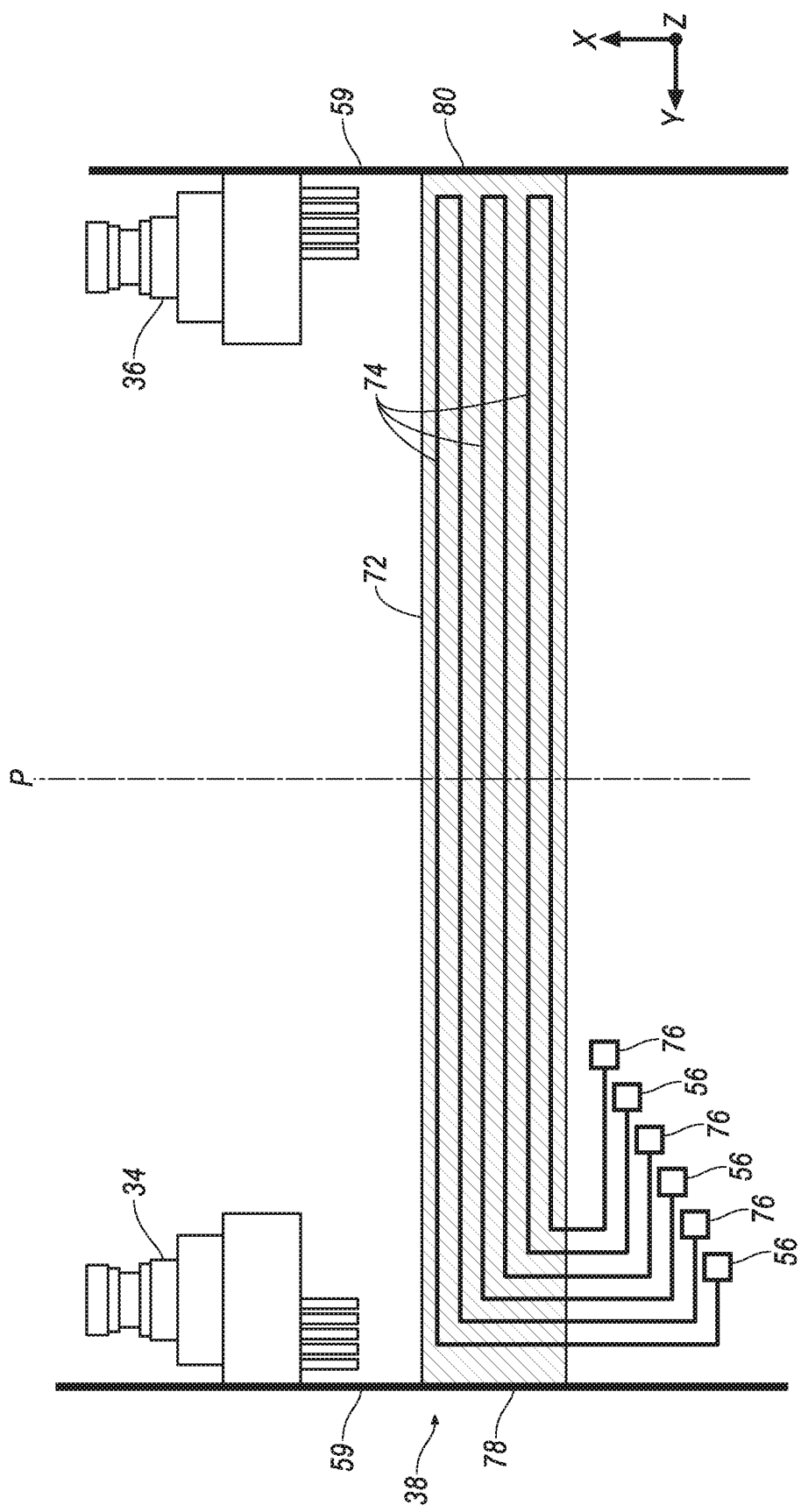
FIG. 10 is a top diagrammatic view of a sixth example of the stereo cameras and sensors for detecting the relative alignment of the stereo cameras.

With reference to the example of FIG. 10, the at least one sensor 38 includes a rod 72, a plurality of optical fibers 74 extending along the rod 72, light sources 76 supplying light through the optical fibers 74, and receptors 56 receiving light from the optical fibers 74. The rod 72 is elongated between two ends 78, 80 fixed relative to a respective one of the stereo cameras 34, 36, i.e., elongated from a first end 78 fixed relative to the first stereo camera 34 to a second end 80 fixed relative to the second stereo camera 36. The optical fibers 74 are each elongated from one of the light sources 76 along an out-and-back path along the rod 72 to one of the receptors 56. The plurality of optical fibers 74 includes at least three optical fibers 74, and the optical fibers 74 are noncollinear in a cross-section of the rod 72. The optical fibers 74 are either embedded in the rod 72 or adhered to a surface of the rod 72. The phase angle shifts of the light passing through the optical fibers 74 is proportional to the stresses that the rod 72 is experiencing, allowing calculation of the curvature of the beam and thus three-dimensional rotation of, e.g., the second end 80 relative to the first end 78, as described below.

Figure 11:
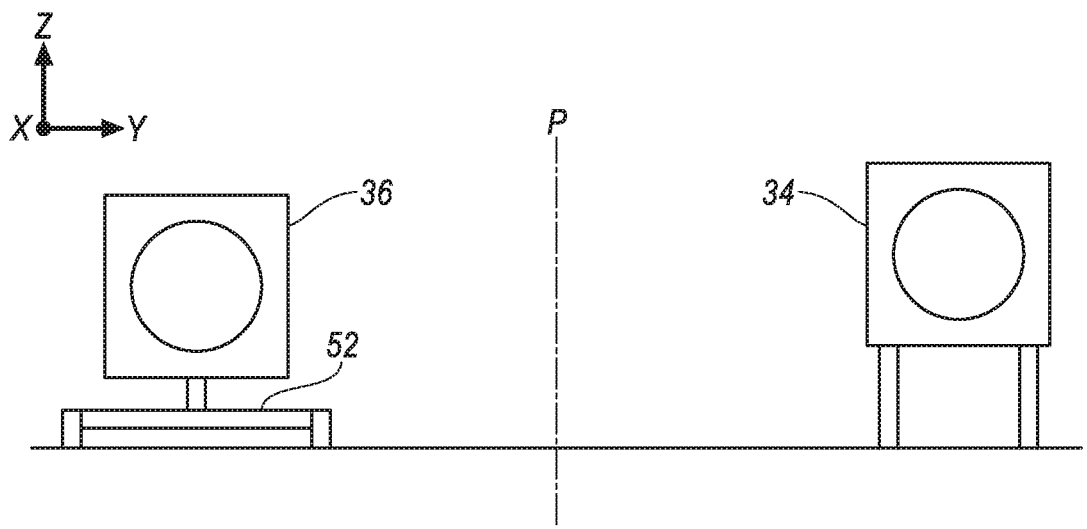
FIG. 11 is a front diagrammatic view of the stereo cameras and an actuator.

With reference to FIG. 11, the system 32 may include at least one actuator 52. The actuator 52 is positioned to move one of the stereo cameras 34, 36, e.g., the second stereo camera 36, in at least two dimensions. For example, as shown in FIG. 11, the actuator 52 can move the second stereo camera 36 in two rotational dimensions, about a horizontal, longitudinal axis X and about the horizontal, lateral axis Y. The at least one actuator 52 can be any suitable type of actuator, e.g., electric, hydraulic, pneumatic, thermal, etc. The at least one actuator 52 can include a single actuator capable of movement in multiple dimensions, multiple actuators capable of movement in a single dimension, or a combination.

Figure 12:
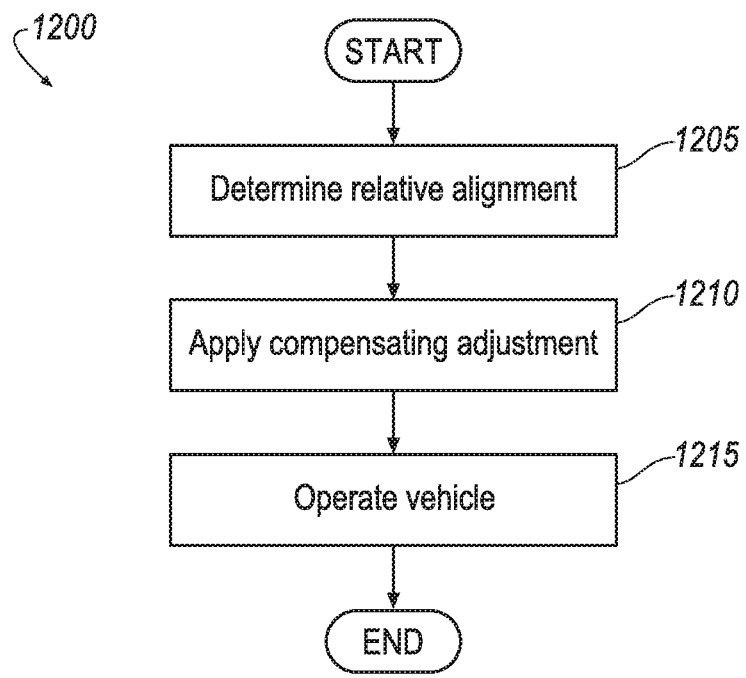
FIG. 12 is a process flow diagram of an example process for controlling the stereo cameras.

FIG. 12 is a process flow diagram illustrating an exemplary process 1200 for controlling the relative alignment of the stereo cameras 34, 36. The memory of the computer 40 stores executable instructions for performing the steps of the process 1200. As a general overview of the process 1200, the computer 40 determines the relative alignment of the stereo cameras 34, 36 and applies a compensating adjustment to one of the stereo cameras 34, 36 based on the relative alignment. The compensating adjustment keeps the relative alignment of the stereo cameras 34, 36 within a maximum deviation from a baseline relative alignment, which increases the reliability of the data from the stereo cameras 34, 36. The process 1200 occurs substantially continuously, with the computer 40 monitoring the relative alignment and applying a corresponding compensating adjustment at each time step as the motion of the vehicle 30 changes the relative alignment.

The process begins in a block 1205, in which the computer 40 determines the relative alignment based on data from the receptor or receptors 56. For a first example, with respect to the at least one sensor 38 shown in FIGS. 3 and 4, the data from the receptors 56 includes speckle patterns, i.e., intensity patterns produced by the mutual interference of a set of wavefronts, for the three surfaces 60 of the reflector 58, and the computer 40 determines the relative alignment based on the speckle patterns. The speckle patterns are the roughness of the surfaces 60 as illuminated by light from the laser 54. As seen by the receptor 56, the speckle patterns display characteristic changes as the relative angle between the respective surfaces 60 and the receptor 56 change, i.e., as the respective surfaces 60 tilt about respective axes. The memory of the computer 40 can store a library of distinctive speckle patterns and corresponding quantities of tilt about an axis, e.g., in degrees, and the computer 40 can reference the library with respect to each of the three surfaces 60. The combination of tilts about three axes defines the relative alignment of the stereo cameras 34, 36.

For a second example, with respect to the at least one sensor 38 shown in FIG. 5, the computer 40 determines the relative alignment based on data from the interferometers 62, specifically, from the fringe patterns generated by the interferometers 62. Characteristics of the fringe patterns, e.g., distance between adjacent fringes, correspond to a degree of tilt about a respective axis. The memory of the computer 40 can store a lookup table of distances between adjacent fringes paired with corresponding quantities of tilt about an axis, e.g., in degrees. The three interferometers 62 generate three fringe patterns and can thus measure tilt about three axes, thus determining the relative alignment in three rotational dimensions.

For a third example, with respect to the at least one sensor 38 shown in FIGS. 6 and 7, the computer 40 determines the relative alignment based on data from laser light reflected by the diffraction gratings 64, specifically, from fringe patterns that the diffraction gratings 64 generate in the reflected light. Characteristics of the fringe patterns, e.g., distance between adjacent fringes, correspond to a degree of tilt about a respective axis. Each fringe pattern from a different diffraction grating 64 provides a measure of rotation about a different axis. The memory of the computer 40 can store a lookup table of distances between adjacent fringes paired with corresponding quantities of tilt about an axis, e.g., in degrees. Fringe patterns from four or nine diffraction gratings 64 can provide robust measurement of relative alignment in three rotational dimensions.

For a fourth example, with respect to the at least one sensor 38 shown in FIG. 8, the computer 40 determines the relative alignment based on data from the deflectometers 66, specifically, the apparent positions of points of light from the lasers 54 on the reflectors 58. Each change in position of one of the points of light corresponds to an angular change about an axis. The memory of the computer 40 can store a lookup table of distance changes of a point of light paired with corresponding quantities of tilt about an axis, e.g., in degrees. The three deflectometers 66 can measure the apparent positions of three points of light and can thus measure tilt about three axes, thus determining the relative alignment in three rotational dimensions.

For a fifth example, with respect to the at least one sensor 38 shown in FIG. 9, the computer 40 determines the relative alignment based on data from the two inertial measurement units 68, 70. The computer 40 can receive changes in three spatial dimensions and three rotational dimensions from each inertial measurement unit, as well as motion information for the vehicle 30 from, e.g., the vehicle computer 48. The computer 40 can subtract the expected changes in dimensions of the inertial measurement units 68, 70 based on the motion of the vehicle 30 from the actual changes in dimensions received from the inertial measurement units 68, 70, which provides the changes in dimensions of the inertial measurement units 68, 70 relative to the rest of the vehicle 30, and then subtract the changes in dimensions of the inertial measurement units 68, 70 from each other to determine the relative alignment in three spatial and three rotational dimensions.

For a sixth example, with respect to the at least one sensor 38 shown in FIG. 10, the computer 40 determines the relative alignment based on data from the receptors 56 attached to the optical fibers 74. The receptors 56 measure the wave patterns of the light returning through the optical fibers 74 and compare the phase angles of the returning light to the phase angles of the light transmitted from the lasers 54 into the optical fibers 74. The phase shifts between the respective phase angles is correlated to the curvature of the rod 72. The memory of the computer 40 can store a lookup table of phase shifts paired with corresponding curvatures. Knowledge of the three curvatures of the rod 72 provides an overall curvature of the rod 72 using geometric principles, as well as giving the relative alignment of the second end 80 to the first end 78, and thus of the second stereo camera 36 relative to the first stereo camera 34, in three rotational dimensions.

After the block 1205, the block 1210 is executed. In the block 1210, the computer 40 applies a compensating adjustment to one of the stereo cameras 34, 36, e.g., the first stereo camera 34, based on the relative alignment. For a first example, if the system 32 includes the actuator 52, the computer 40 instructs the actuator 52 to move the second stereo camera 36 based on the relative alignment. The actuator 52 moves the second stereo camera 36 in at least two dimensions to compensate, i.e., cancel out, the change in relative alignment between the stereo cameras 34, 36, e.g., tilting the second stereo camera 36 0.5° left and 0.8° backwards in response to a relative alignment in which the first stereo camera 34 has tilted 0.5° left and 0.8° backwards relative to the second stereo camera 36.

For a second example, if the system 32 lacks the actuator 52, the compensating adjustment is a pixel shift in two dimensions applied to visual data from one of the stereo cameras 34, 36, e.g., the first stereo camera 34. A pixel shift of, e.g., 3 pixels up and 4 pixels left, means that each pixel in the visual data is treated as though recorded in a position in the field of view that is, e.g., 3 pixels up and 4 pixels left than where that pixel was actually recorded. The memory of the computer 40 can store a first lookup table with tilt in degrees about the lateral, horizontal axis Y paired with a number of pixels of horizontal shift, and a second lookup table with tilt in degrees about the vertical axis Z paired with a number of pixels of vertical shift. The pairings of tilt and pixels can be determined geometrically.

Figure 13:
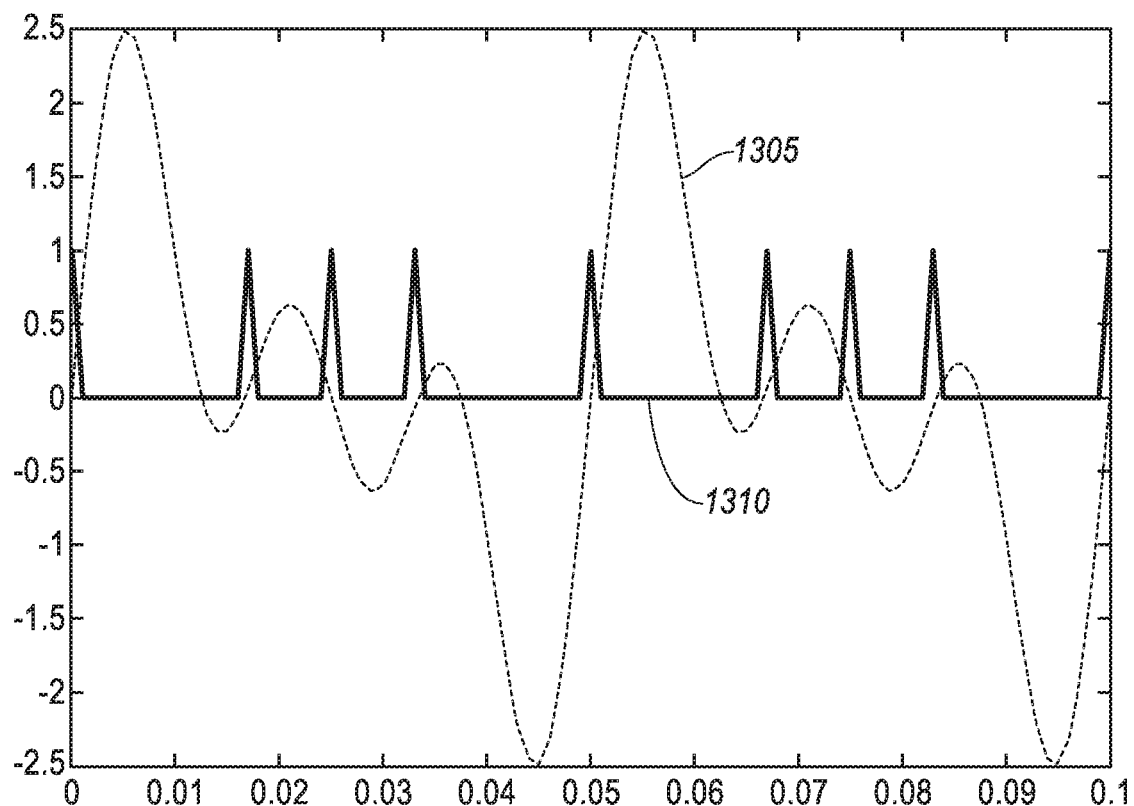
FIG. 13 is a plot of relative alignment of the stereo cameras versus time.

For a third example, if the system 32 lacks the actuator 52, the computer 40 applies a compensating adjustment by discarding visual data produced when the relative alignment is outside a threshold. The threshold can be independent for each of two dimensions, e.g., the relative alignment exceeds the threshold by being at least 0.5° about the lateral, horizontal axis Y or by being at least 0.5° about the vertical axis Z. Alternatively, the threshold can be two dimensions combined, e.g., the relative alignment exceeds the threshold by the sum of the tilt about the lateral, horizontal axis Y and the about the vertical axis Z being at least 0.75°. FIG. 13 shows a plot 1305 of the relative alignment over time along with a plot 1310 of retaining or discarding the visual data. When the plot 1305 crosses the horizontal axis, i.e., is within an absolute value threshold of the axis, the plot 1310 shows the visual data being retained (represented by equaling one), and otherwise when the plot 1305 is farther from the horizontal axis, the plot 1310 shows the visual data being discarded (represented by equaling zero).

After the block 1210, the block 1215 is executed. In the block 1215, the computer 40 or the vehicle computer 48 operates the vehicle 30 according to data from the stereo cameras 34, 36 with the compensating adjustment applied. For example, the computer 40 transmits the data from the stereo cameras 34, 36 to the vehicle computer 48, and the vehicle computer 48 operates, e.g., the propulsion, the brake system, and the steering with known autonomous driving algorithms. After the block 1215, the process 1200 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance or order. "Substantially" as used herein means that a dimension, time duration, shape, or other adjective may vary slightly from what is described due to physical imperfections, power interruptions, variations in machining or other manufacturing, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   two stereo cameras mounted on a vehicle;
   at least one sensor arranged to detect a relative alignment of the stereo cameras; and
   a computer communicatively coupled to the stereo cameras and the at least one sensor;
   wherein the at least one sensor includes a laser and a receptor each fixed relative to a first of the stereo cameras and a reflector fixed relative to a second of the stereo cameras;
   wherein the reflector has at least three diffuse, nonplanar surfaces; and
   the computer is programmed to:
      determine the relative alignment based on data from the receptor, the data from the receptor including speckle patterns for each of the three surfaces, the relative alignment including tilts about three axes, each tilt determined by a respective one of the speckle patterns; and
      continuously apply a compensating adjustment to one of the stereo cameras based on the relative alignment.

2. The system of claim 1, further comprising at least one actuator positioned to move the one of the stereo cameras in at least two dimensions, wherein applying a compensating adjustment to one of the two stereo cameras includes instructing the at least one actuator to move the one of the stereo cameras.

3. The system of claim 1, wherein the compensating adjustment is a pixel shift in two dimensions applied to visual data from the one of the stereo cameras.

4. The system of claim 1, wherein applying a compensating adjustment to one of the two stereo cameras includes discarding all visual data produced when the relative alignment is outside a threshold.

5. A computer comprising a processor and a memory storing instructions executable by the processor to:
   continuously apply a compensating adjustment to one of two stereo cameras mounted on a vehicle based on a relative alignment of the stereo cameras;
   wherein applying a compensating adjustment to one of the two stereo cameras includes discarding all visual data produced when the relative alignment is outside a threshold.

6. The computer of claim 5, wherein the instructions further include determining the relative alignment based on data from a receptor positioned to detect light generated by a laser fixed relative to one of the stereo cameras and reflected off a reflector fixed relative to the other of the stereo cameras.

7. The computer of claim 6, wherein the reflector has at least three diffuse, nonplanar surfaces, and wherein the data from the receptor includes speckle patterns for the three surfaces.

8. The computer of claim 6, wherein the laser and the receptor are included in one of at least three interferometers, and determining the relative alignment based on data from the receptor includes determining the relative alignment based on data from the interferometers.

9. The computer of claim 6, wherein the reflector includes a plurality of diffraction gratings each having a different orientation.

10. The computer of claim 6, wherein the laser and the receptor are included in one of at least three deflectometers, and determining the relative alignment based on data from the receptor includes determining the relative alignment based on data from the deflectometers.

11. The computer of claim 5, wherein the instructions further include determining the relative alignment based on data from two inertial measurement units each fixed relative to a respective one of the stereo cameras.

12. The computer of claim 5, wherein the instructions further include determining the relative alignment based on data from a sensor detecting light transmitted through a plurality of optical fibers extending along a rod elongated between two ends fixed relative to a respective one of the stereo cameras.

13. The computer of claim 5, wherein the relative alignment is represented at least in two rotational dimensions.

14. The computer of claim 13, wherein the relative alignment is outside the threshold when either of the two rotational dimensions is outside the threshold.

15. The computer of claim 13, wherein the relative alignment is outside the threshold when a sum of the two rotational dimensions is outside the threshold.

16. A method comprising:
   continuously applying a compensating adjustment to one of two stereo cameras mounted on a vehicle based on a relative alignment of the stereo cameras;
   wherein applying a compensating adjustment to one of the two stereo cameras includes discarding all visual data produced when the relative alignment is outside a threshold.

17. The method of claim 16, further comprising determining the relative alignment based on data from a receptor positioned to detect light generated by a laser fixed relative to one of the stereo cameras and reflected off a reflector fixed relative to the other of the stereo cameras.

18. The method of claim 17, wherein the reflector has at least three diffuse, nonplanar surfaces, and wherein the data from the receptor includes speckle patterns for the three surfaces.

19. The method of claim 17, wherein the laser and the receptor are included in one of at least three interferometers, and determining the relative alignment based on data from the receptor includes determining the relative alignment based on data from the interferometers.

20. The method of claim 17, wherein the reflector includes a plurality of diffraction gratings each having a different orientation.

* * * * *